United States Patent
Karn

(10) Patent No.: US 10,831,912 B2
(45) Date of Patent: *Nov. 10, 2020

(54) IN A DATA PROCESSING SYSTEM ENVIRONMENT PERFORMING AN OPERATION ON SENSITIVE DATA

(71) Applicant: International Business Machines Corporation, Armonk, NY (US)

(72) Inventor: Holger Karn, Aidlingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/286,034

(22) Filed: Feb. 26, 2019

(65) Prior Publication Data

US 2019/0188401 A1   Jun. 20, 2019

Related U.S. Application Data

(63) Continuation of application No. 14/734,456, filed on Jun. 9, 2015, now Pat. No. 10,366,244.

(51) Int. Cl.
*G06F 21/62* (2013.01)
*H04L 29/06* (2006.01)

(52) U.S. Cl.
CPC ...... *G06F 21/6209* (2013.01); *H04L 63/0428* (2013.01); *G06F 21/6245* (2013.01)

(58) Field of Classification Search
CPC ... G06F 21/10; G06F 21/6245; G06Q 20/085; H04L 67/12
USPC .......................................................... 726/30
See application file for complete search history.

(56) References Cited

U.S. PATENT DOCUMENTS

| 6,385,727 B1 * | 5/2002 | Cassagnol ............... G06F 21/10 380/259 |
| 6,792,113 B1 * | 9/2004 | Ansell ..................... G06F 21/10 380/284 |
| 6,996,547 B1 * | 2/2006 | Tugenberg ........... G06Q 20/085 355/52 |

(Continued)

OTHER PUBLICATIONS

Office Action (dated Sep. 6, 2016) for U.S. Appl. No. 14/734,456, filed Jun. 9, 2015.

(Continued)

*Primary Examiner* — Bryan F Wright
(74) *Attorney, Agent, or Firm* — Schmeiser, Olsen & Watts, LLP; Stephanie Carusillo

(57) ABSTRACT

A method and system for performing an operation on protected sensitive data. A processor of a data processing system receives, from a computing system: (i) the protected sensitive data, (ii) an identification of an operation that accesses and utilizes the protected sensitive data during performance of the operation, and (iii) a request to perform the operation, wherein the computing system is external to the data processing system. The processor de-protects the received protected sensitive data, which generates unprotected sensitive data from the protected sensitive data. The processor performs the operation, which includes accessing and utilizing the unprotected sensitive data and generating a result. After the operation is performed, the processor re-protects the unprotected sensitive data, which restores the protected sensitive data. The processor sends the result to the computing system.

20 Claims, 5 Drawing Sheets

(56) References Cited

U.S. PATENT DOCUMENTS

| | | | |
|---|---|---|---|
| 7,093,295 B1 * | 8/2006 | Saito | G11B 20/00086 380/200 |
| 7,149,308 B1 | 12/2006 | Fruehauf et al. | |
| 7,627,756 B2 * | 12/2009 | Fujibayashi | G06F 11/1076 713/165 |
| 8,495,384 B1 | 7/2013 | DeLuccia | |
| 8,839,004 B1 | 9/2014 | Bennett et al. | |
| 9,369,443 B1 | 6/2016 | Sinor | |
| 9,507,929 B1 * | 11/2016 | Kumar | G06F 21/6281 |
| 2003/0093683 A1 | 5/2003 | Wong et al. | |
| 2004/0153672 A1 | 8/2004 | Watt et al. | |
| 2006/0075228 A1 * | 4/2006 | Black | H04L 63/104 713/167 |
| 2011/0167223 A1 | 7/2011 | Isono | |
| 2011/0179270 A1 | 7/2011 | Tewari et al. | |
| 2012/0106366 A1 | 5/2012 | Gauvin | |
| 2013/0067243 A1 | 3/2013 | Tamayo-Rios et al. | |
| 2013/0177156 A1 | 7/2013 | Ryan | |
| 2013/0198080 A1 | 8/2013 | Anderson et al. | |
| 2014/0013452 A1 | 1/2014 | Aissi et al. | |
| 2014/0075493 A1 | 3/2014 | Krishnan et al. | |
| 2014/0082749 A1 | 3/2014 | Holland et al. | |
| 2014/0178041 A1 | 6/2014 | Thevar | |
| 2014/0195798 A1 | 7/2014 | Brugger et al. | |
| 2016/0196432 A1 * | 7/2016 | Main | G06F 8/61 726/1 |
| 2016/0246995 A1 * | 8/2016 | Dictos | G06F 21/6245 |
| 2016/0364578 A1 | 12/2016 | Karn | |
| 2017/0270358 A1 * | 9/2017 | Salemizadeh | H04L 67/12 |

OTHER PUBLICATIONS

Amendment (dated Dec. 2, 2016) for U.S. Appl. No. 14/734,456, filed Jun. 9, 2015.
Final Office Action (dated Mar. 10, 2017) for U.S. Appl. No. 14/734,456, filed Jun. 9, 2015.
Final amendment (dated May 8, 2017) for U.S. Appl. No. 14/734,456, filed Jun. 9, 2015.
Advisory Action (dated Jun. 9, 2017) for U.S. Appl. No. 14/734,456, filed Jun. 9, 2015.
RCE (dated Jun. 9, 2017) for U.S. Appl. No. 14/734,456, filed Jun. 9, 2015.
Office Action (dated Jul. 12, 2017) for U.S. Appl. No. 14/734,456, filed Jun. 9, 2015.
Amendment (dated Oct. 11, 2017) for U.S. Appl. No. 14/734,456, filed Jun. 9, 2015.
Final Office Action (dated Jan. 11, 2018) for U.S. Appl. No. 14/734,456, filed Jun. 9, 2015.
Final amendment (dated Mar. 12, 2018) for U.S. Appl. No. 14/734,456, filed Jun. 9, 2015.
Advisory (dated Apr. 16, 2018) for U.S. Appl. No. 14/734,456, filed Jun. 9, 2015.
RCE and amendment (dated May 16, 2018) for U.S. Appl. No. 14/734,456, filed Jun. 9, 2015.
Office Action (dated Aug. 10, 2018) for U.S. Appl. No. 14/734,456, filed Jun. 9, 2015.
Amendment (dated Nov. 8, 2018) for U.S. Appl. No. 14/734,456, filed Jun. 9, 2015.
Notice of Allowance (dated Jan. 15, 2019) for U.S. Appl. No. 14/734,456, filed Jun. 9, 2015.
312 amendment (dated Feb. 19, 2019) for U.S. Appl. No. 14/734,456, filed Jun. 9, 2015.

* cited by examiner

IN A DATA PROCESSING SYSTEM ENVIRONMENT PERFORMING AN OPERATION ON SENSITIVE DATA

This application is a continuation application claiming priority to Ser. No. 14/734,456, filed Jun. 9, 2015, now U.S. Pat. No. 10,366,244, issued Jul. 30, 2019.

TECHNICAL FIELD

The present invention relates generally to a method for securely operating on sensitive data and, more specifically to a method for identifying and executing operations on protected sensitive data. The invention relates further to a system for identifying and executing operations on protected sensitive data, and a computer program product.

BACKGROUND

Public, private, and hybrid Clouds and other virtualization solutions (further on called 'Cloud') help to minimize costs and give companies flexibility in scaling up or down with their needs. However, such solutions may be problematic from a data privacy perspective as laws and regulations in different territories may require special protection of sensitive data which can go far beyond well-known computer security mechanisms, such as data encryption, firewalls, or intrusion detection and prevention. It is not unusual that such sensitive data come with constraints which make it difficult or sometimes even impossible for Cloud service providers to comply with. Examples of such constraints are that data have to stay in a certain region or state, or that access to that data for administrative or operational purposes can only be granted to persons with a certain nationality. And usually the compliance with such regulations has to be proven and may need to be validated regularly by an external auditor accepted by the regulator—which comes along with a huge continuous investment from the Cloud service provider and the Cloud service consumer, as in most cases the certification of compliance is the responsibility of the service consumer and the service provider has to assist with that.

Data encryption for data in transit and data on disk do unfortunately not help here because sooner or later the data need to be decrypted to be processed in the Cloud, which then requires that the Cloud solution needs to be fully compliant with the data privacy constraints.

A typical solution is addressing that problem by encrypting any data when it enters the Cloud. If all data are encrypted, and the systems operate only on the encrypted data, then from the perspective of data privacy, the environment may operate on "data waste" and the data privacy rules do not apply. But those solutions have a couple of issues: (1) logical operations like sorting, filtering, or adjusting date and time formats on the presentation layer do not work because the Cloud application would perform that operation on encrypted data; (2) any data modification in the business logic by a Cloud application would not work as the data are encrypted; (3) any interface inserting or extracting data to or from Cloud systems would have to be intercepted so that encrypted data can be decrypted and vice versa.

In a typical embodiment of such a solution, users are typically accessing data through a Web portal. This may also be assumed here.

A disadvantage of known solutions remain in the sense that applications operating on sensitive data may require specific provisions to operate with such sensitive data in comparison to non-sensitive data.

Thus, there is a need to overcome the difference in data handling that an application program has to be aware of operating on sensitive and/or non-sensitive data if the sensitive data are stored and operated on in a Cloud computing environment.

BRIEF SUMMARY

A method, system, and computer program product for performing an operation on protected sensitive data. According to an embodiment, a processor of a data processing system receives, from a computing system: (i) the protected sensitive data, (ii) an identification of an operation that accesses and utilizes the protected sensitive data during performance of the operation, and (iii) a request to perform the operation, wherein the computing system is external to the data processing system. The processor de-protects the received protected sensitive data, which generates unprotected sensitive data from the protected sensitive data. The processor performs the operation, which includes accessing and utilizing the unprotected sensitive data and generating a result. After the operation is performed, the processor re-protects the unprotected sensitive data, which restores the protected sensitive data. The processor sends the result to the computing system.

BRIEF DESCRIPTION OF THE DRAWINGS

It should be noted that embodiments of the invention are described with reference to different subject-matter. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matter, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Embodiments of the invention will be described, by way of example only, and with reference to the following drawings.

Figure 1:
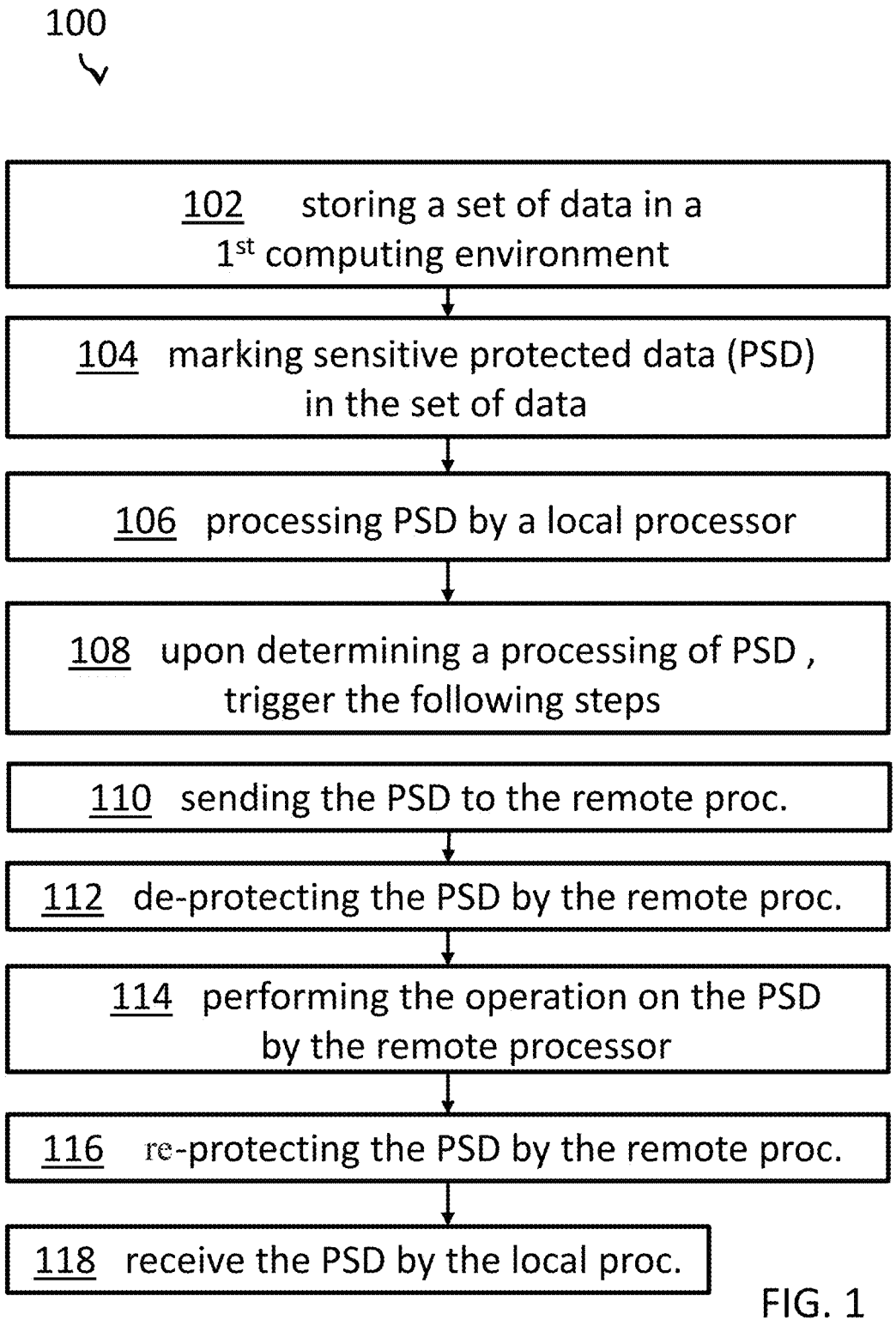

FIG. 1 shows a block diagram of an embodiment of the inventive method for identifying and executing operations on protected sensitive data.

Figure 2:
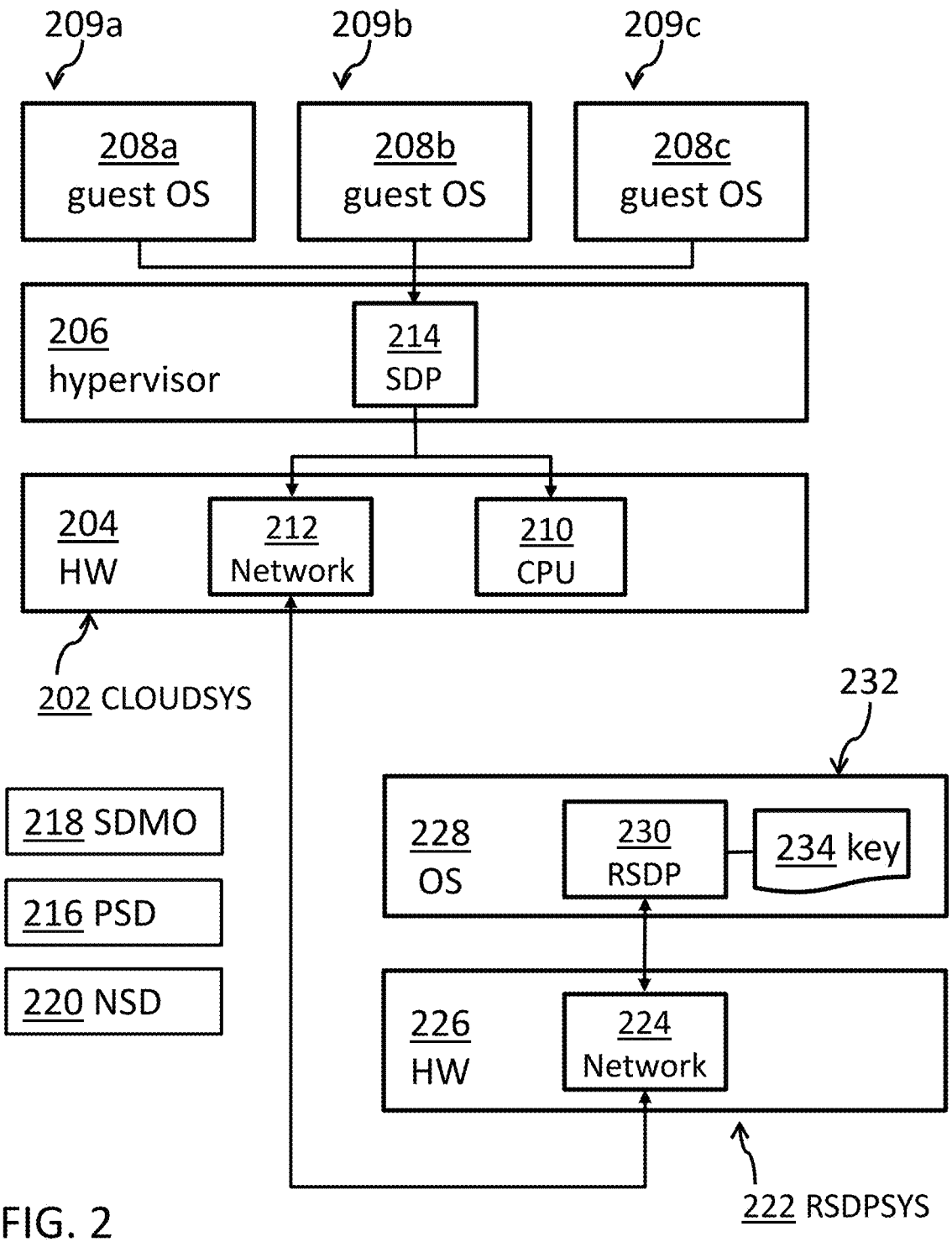

FIG. 2 shows a block diagram of an embodiment a data privacy solution for a Cloud computing environment.

Figure 3:
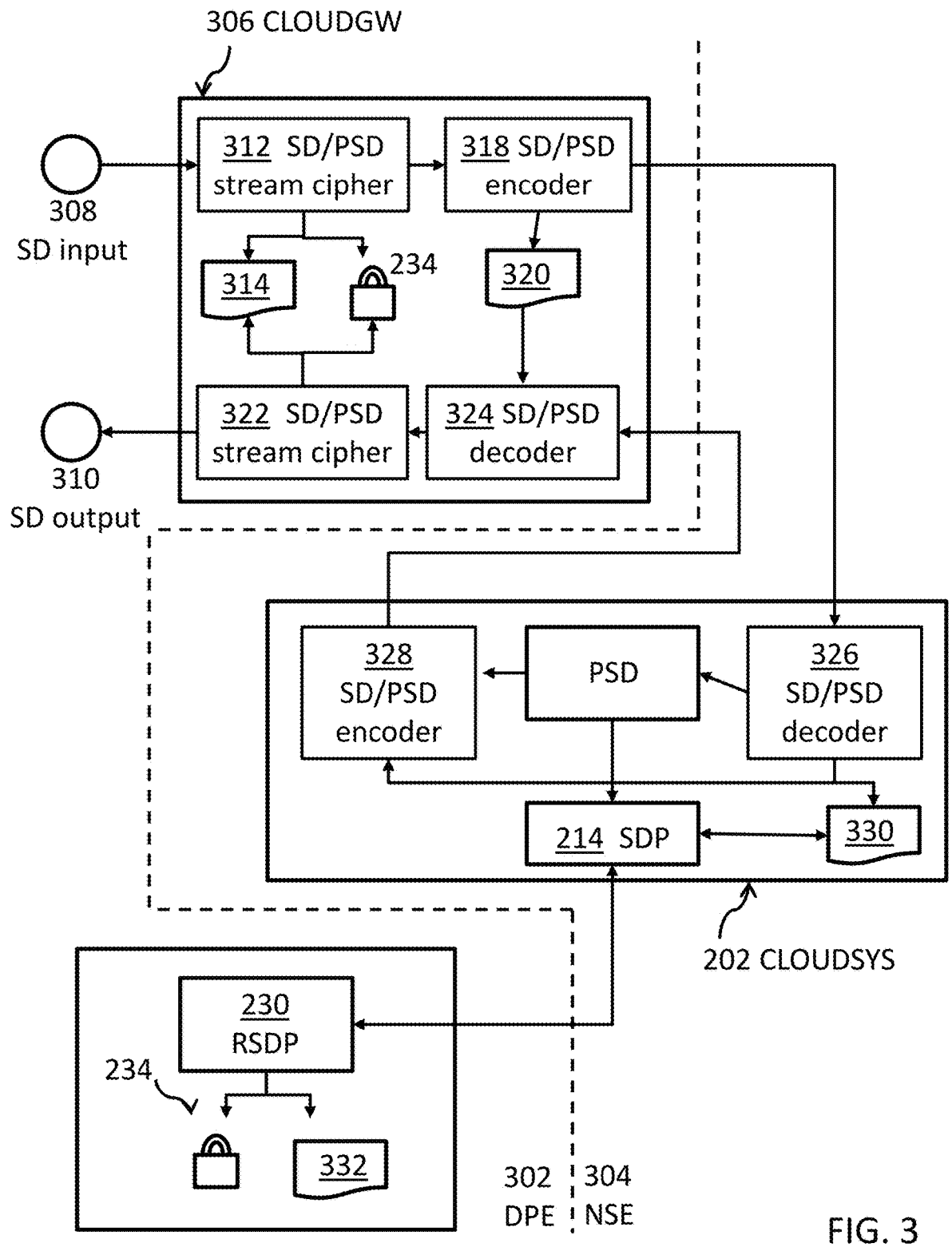

FIG. 3 shows a block diagram of an embodiment of an integration of a data privacy environment and a non-sensitive environment.

Figure 4:
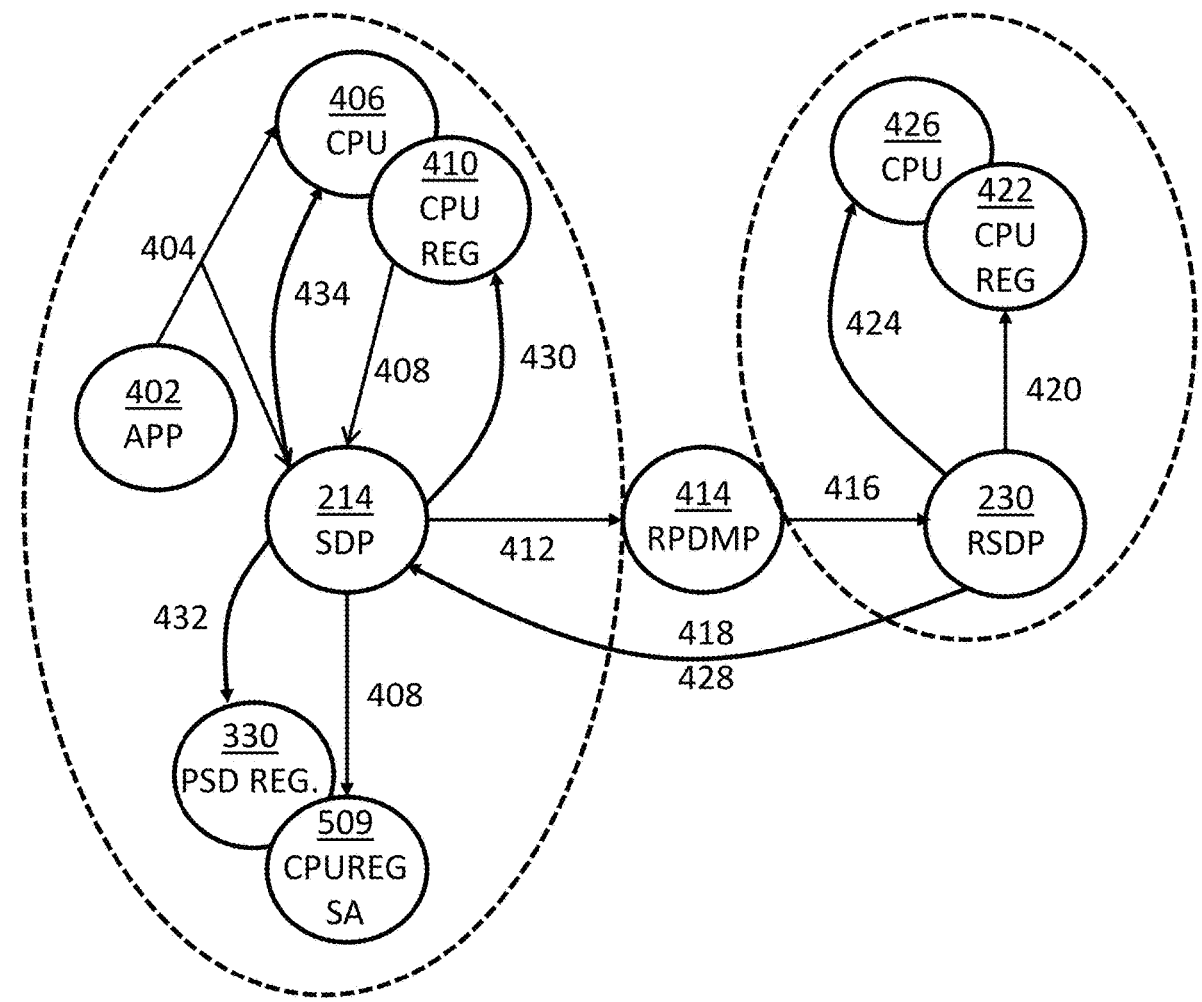

FIG. 4 illustrates an embodiment of how the sensitive data processor and the remote sensitive data processor perform operations.

Figure 5:
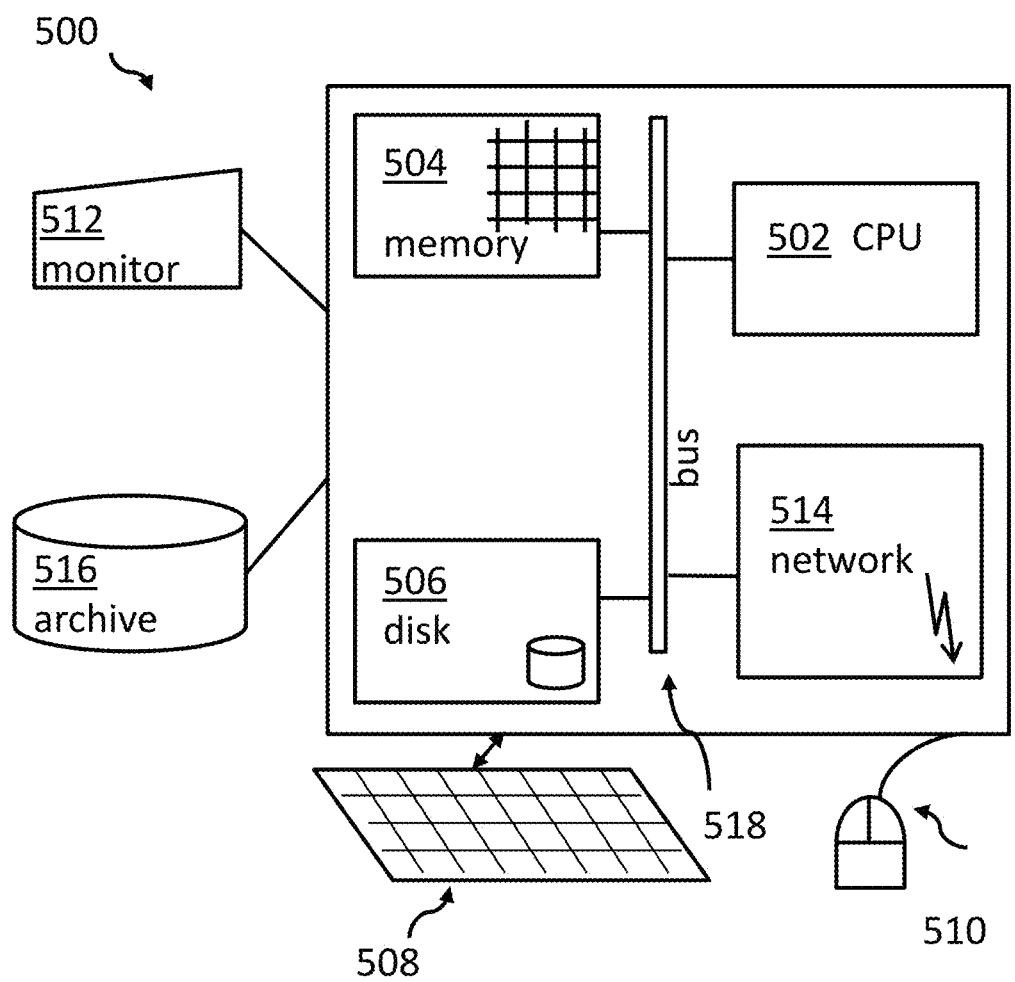

FIG. 5 shows an embodiment of a computing system for executing the presented solution.

DETAILED DESCRIPTION

The need described above may be addressed by a method for identifying and executing operations on protected sensitive data, a system for identifying and executing operations on protected sensitive data, and a related computer program product, according to the independent claims.

According to one embodiment of the present invention, a method for identifying and executing operations on protected sensitive data may be provided. The method may comprise storing a set of data in a first computing environment, marking protected sensitive data within the set of data by metadata for the set of data, and processing data out of the set of data by a local processor of the first computing environment. In response to determining that during the processing an operation is involving an access to the protected sensitive data, the method may comprise sending the protected sensitive data as well as information about the operation that is involving the access to the protected sensitive data to a remote processor. Here, the protected sensitive data may be de-protected by the remote processor. The operation may be performed on the sensitive data by the remote processor, a result of the operation may be re-protected by the remote processor, and the result of the operation may be received by the local processor.

According to another embodiment of the present invention, a system for identifying and executing operations on protected sensitive data may be provided. The system may comprise a storage configured to store a set of data in a first computing environment, a marker unit configured to mark protected sensitive data within the set of data by metadata for the set of data, and a local processor as part of the first computing environment. The local processor may be configured to process data out of the set of data. The system may also comprise a determining unit configured to determine that during the processing an operation is involving an access to the protected sensitive data. The determination unit may also be configured to activate, in response to determining that during the processing an operation is involving an access to the protected sensitive data, a sending unit configured to send the protected sensitive data as well as information about the operation that is involving the access to the protected sensitive data to a remote processor. The determination unit may also activate the remote processor for a de-protection the protected sensitive data, for performing the operation, for a re-protection a result of the operation, and also for activating a receiving unit configured to receive the result of the operation.

Additionally, a related computer program product may be provided.

It may be noted that the first computing environment may be a networked computing environment, e.g., a Cloud computing environment operated by a Cloud service provider.

The proposed method and the related system for identifying and executing operations on protected sensitive data may offer a couple of advantages:

Sensitive data and non-sensitive data may be stored and operated on by applications in the Cloud environment without compromising sensitive data which may be protected by, e.g., encryption or tokenization. The operation on sensitive data may be performed outside of the Cloud data center at a remote location in a secure way, such that sensitive data may not be decrypted in the environment of the primary Cloud service provider. Instead, a requirement for an operation on protected sensitive data, e.g., by an application, may be detected automatically during an operation on a mixture of sensitive and non-sensitive data. It may be assumed that the sensitive data are protected in the sense of an encryption or tokenization. The sensitive data are then "on the fly" transferred into a secure operating environment of a remote processor. This remote processor, which may be part of a computer system, may be operated at a location where different regulatory requirements and laws, i.e., data protection laws or privacy laws, may be applicable. Thus, a requirement to operate on sensitive data within the boundaries of a specific country, or, e.g., in the healthcare industry, may be addressed without losing the advantage of storing the sensitive data in a protected, i.e., encrypted or tokenized form in a Cloud computing environment which may otherwise not comply with data privacy laws. There may be no requirement for a software application to reflect the requirement to distinguish between sensitive and non-sensitive data during operation of the application in the Cloud computing environment. From an application perspective, the remote operation may be completely transparent. It may also be understood that decryption information for the protected sensitive data may never be provided to the Cloud computing environment, but only to a user controlled computer system and the remote processor which may both comply with data privacy regulatory requirements.

According to one embodiment of the method, the local processor and the remote processor may be located at different geographical locations. The local processor may be operated by the Cloud computing provider or Cloud service provider, and the remote processor may be operated in a data privacy law compliant place. Thus, an operation on sensitive and non-sensitive data are separated from each other, and the sensitive information may not be compromised.

According to another embodiment of the method, also information about parts of a processor status of the local processor may be sent to the remote processor alongside the operation that is involving the access to the protected sensitive data and the operation accessed sensitive and not sensitive data. Hence, the complete computer context may be sent over to the remote processor such that the remote processor may continue the operation of the application without interrupting the flow of the application program. The process may be completely transparent for the application program.

According to another optional embodiment of the method, the sending the information about parts of the processor status of the local processor and the accessed sensitive and not sensitive data to the remote processor may be performed by using a remote direct memory access protocol, i.e., RDMA. A skilled person may acknowledge that a remote direct memory access (RDMA) may be a direct memory access from the memory of one computer into that of another without involving neither one's operating system. This permits high-throughput, low-latency networking, which may be especially useful in massively parallel computer clusters. RDMA supports zero-copy networking by enabling the network adapter to transfer data directly to or from application memory, eliminating the need to copy data between application memory and the data buffers in the operating system. Such transfers may require no work to be done by CPUs, caches, or context switches, and transfers may continue in parallel with other system operations. When an application may perform an RDMA Read or Write request, the application data may be delivered directly to the network, reducing latency and enabling a fast message transfer.

According to an advantageous embodiment of the method, the protected sensitive data are updated in the set of data after the receiving the result of the operation by the local processor. This may also be performed using the RDMA protocol. Thus, the operation of the local processor running an application may be continuing with operations on non-sensitive, non-protected data. Also under this aspect, the remote operation on the sensitive data, which may be stored in a mixed way with the non-sensitive data in the Cloud computing environment, may be completely transparent to the application.

According to one embodiment of the method, the determining that during the processing an operation is involving an access to the protected sensitive data is performed by a sensitive data processor. It may be implemented in hardware or software. In a potential software implementation, it may be instrumental to include the sensitive data processor in a memory management function of an operating system or into a hypervisor. Metadata for the set of data may be used to enable the sensitive data processor to determine operation on the protected sensitive data.

According to one advantageous embodiment of the method, a length of the protected sensitive data within the set of data may be equal to the length of the sensitive data in an unprotected form. The length of the protected sensitive data may be measured in bits or bytes. This may be a prerequisite for not changing application code if operations on sensitive data and non-sensitive data may be performed at different locations on different computing systems, in case the sensitive data processor interrupts the operation on the set of data because protected sensitive data are involved.

According to one additional embodiment of the method, the metadata may be stored in a protected sensitive data register. This may enable a very fast determination for operations on sensitive data. No loading of those metadata from a storage system may be required.

In one embodiment of the method, a gateway, in particular a Cloud gateway, may intercept an access to the set of data in the first computing environment, in particular by a user with a browser. The gateway may encrypt the sensitive data in the set of data before sending the set of data towards the first computing environment. The gateway may be implemented on the side of a user or user computer system. In such a case, sensitive data may always be transmitted over networks in a protected form. Alternatively to an encryption/decryption method, also here tokenization may be used as a data protection method. This may be similar to a data protection using tokenization between the local processor of the first computing environment and the remote processor.

In one optional embodiment of the method, an identical encryption/decryption key may be provided to the gateway and the remote processor. The remote processor may receive the encryption/decryption key from a user. This encryption/decryption key may not be provided to the first computing environment, i.e., the operator or provider of the first computing environment, i.e., the Cloud service provider.

As mentioned above, in one optional embodiment, the protection of the protected sensitive data may be achieved by tokenization. This may be achieved by a specific form of protected data called Searchable Strong Encryption (SSE) which may be an alternative to a classical random tokenization process.

It may be understood that the features and details for the method may also be applicable for the related system and computer program product.

In the context of this description, the following conventions, terms and/or expressions may be used.

The term 'operation' may denote one or more computer instructions to be performed on data, in particular, on sensitive data or non-sensitive data. An operation may alter the content of the data. In any case, protected sensitive data may be available in an unprotected form.

The term 'protected sensitive data' may denote data which may have to be protected from unauthorized access. Only entities—people or systems—having predefined privileges may be allowed to access the protected sensitive data. The protection may be achieved by encryption or tokenization. Sensitive data may be data that may have to be protected from unauthorized access, e.g., according to legal regulations or because the data comprise private information which may not be accessed by other people or computer systems, e.g., bank account access codes, credit card information, or medical information.

The term 'networked computing environment' may denote a computing center operated by a provider. Another term for "network computing environment" may be a Cloud computing center or Cloud computing environment, or as mentioned above, first computing environment.

The term 'set of data' may denote data organized, e.g., in records, comprising people-related data, like name, date of birth, address, annual income, family status or the like. The set of data may also be a set of data relating to a company or another data sensitive organization. However, generally, in the set of data, a mixture of sensitive and non-sensitive data may be comprised. Typically, only a relatively small portion of a data set may comprise sensitive data. Thus, in the set of data there may be a mixture of sensitive—or protected sensitive data—and data which may not require any protection.

The term 'metadata' may denote data about data. Here, the metadata about the set of data may comprise information about the specific components within the set of data which comprise sensitive data and/or protected sensitive data.

The term 'local processor' may denote a processor or a computing system as part of the first Cloud computing environment. This local processor may not have permission to access protected sensitive data.

The term 'remote processor' may denote a processor or computing system typically located in a different geographical position than the local processor. The remote processor may have permission to access the protected sensitive data. It may be required that the remote processor de-protects or decrypts received protected sensitive data before it may be able to operate on the data.

The term 'de-protecting' may denote an activity of isolating data in an unprotected form out of the protected sensitive data. This may be performed by decryption or a part of a tokenization process. After an operation having been performed on data in the unprotected form, the data may have to be protected again, e.g., with the same protection key. This process may be denoted as 're-protecting' or 're-protection'.

The term 'sensitive data processor' may denote an element being adapted to identify protected sensitive data in a stream of data as part of the set of data. The sensitive data processor may use the metadata to identify those parts of the set of data that are protected sensitive data.

The term 'memory management' may denote a component of an operating system being responsible for an allocation and administration of memory elements in a computing environment. It may not be intermixed with the memory managed unit which may be part of the standard elements of a computing system. The memory management may make use of the memory management unit.

The term 'hypervisor' or virtual machine monitor may denote a piece of computer software, firmware or hardware that creates and runs virtual machines. A computer, on which a hypervisor is running one or more virtual machines, may be defined as a host machine. Each virtual machine is called a guest machine. The hypervisor presents the guest operating systems with a virtual operating platform and manages the execution of the guest operating systems. Multiple instances of a variety of operating systems may share the virtualized hardware resources.

It may be understood in advance that although this disclosure includes aspects and a detailed description on Cloud computing, implementation of the teachings recited herein are not limited to a Cloud computing environment. Rather, embodiments of the present invention are capable of being implemented in conjunction with any other type of computing environment now known or later developed.

In this document, Cloud storage service is mentioned several times. Such a service belongs to Cloud computing in general, which is a model for enabling convenient, on-demand network access to a shared pool of configurable computing resources (e.g., networks, servers, storage, applications, and services) that can be rapidly provisioned and released with minimal management effort or service provider interaction. This Cloud model promotes availability and is composed of five essential characteristics, three service models and four deployment models.

Essential Characteristics of Cloud computing comprise:

On-demand self-service: A consumer can unilaterally provision computing capabilities, such as server time and network storage, as needed automatically without requiring human interaction with each service provider.

Broad network access: Capabilities are available over the network and accessed through standard mechanisms that promote use by heterogeneous thin or thick client platforms (e.g., mobile phones, laptop computers, tablet computers, and PDAs).

Resource pooling: The provider's computing resources are pooled to serve multiple consumers using a multi-tenant model with different physical and virtual resources, dynamically assigned and reassigned according to consumer demand. There is a sense of location independence in that the customer generally has no control or knowledge over the exact location of the provided resources, but may be able to specify location at a higher level of abstraction (e.g., country, state, or datacenter). Examples of resources include storage, processing, memory, network bandwidth and virtual machines.

Rapid elasticity: Capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both, the provider and consumer of the utilized service.

Service models for Cloud Computing used comprise:

Cloud Software as a Service (SaaS): The capability provided to the consumer is to use the provider's applications running on a Cloud infrastructure. The applications are accessible from various client devices through a thin client interface such as a Web browser (e.g., Web-based e-mail). The consumer does not manage or control the underlying Cloud infrastructure including network, servers, operating systems, storage, or even individual application capabilities, with the possible exception of limited user-specific application configuration settings.

Cloud Platform as a Service (PaaS): The capability provided to the consumer is to deploy onto the Cloud infrastructure consumer-created or acquired applications created using programming languages and tools supported by the provider. The consumer does not manage or control the underlying Cloud infrastructure including network, servers, operating systems, or storage, but has control over the deployed applications and possibly applications hosting environment configurations.

Cloud Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying Cloud infrastructure, but has control over operating systems, storage, deployed applications, and possibly limited control of selected networking components (e.g., host firewalls).

Deployment models for Cloud computing comprise:

Private Cloud. The Cloud infrastructure is operated solely by an organization. It may be managed by the organization or a third party and may exist on premise or off premise.

Community Cloud. The Cloud infrastructure is shared by several organizations and supports a specific community that has shared concerns (e.g., mission, security requirements, policy, and compliance considerations). It may be managed by the organizations or a third party and may exist on premise or off premise.

Public Cloud. The Cloud infrastructure is made available to the general public or a large industry group and is owned by an organization selling Cloud services, e.g., a Cloud Service provider.

Hybrid Cloud. The Cloud infrastructure is a composition of two or more Clouds (private, community, or public) that remain unique entities but are bound together by standardized or proprietary technology that enables data and application portability (e.g., Cloud bursting for load-balancing between Clouds).

It may be noted that Cloud software takes full advantage of the Cloud paradigm by being service-oriented with a focus on statelessness, low coupling, modularity, and semantic interoperability.

In the following, a detailed description of the figures will be given. All instructions in the figures are schematic. Firstly, a block diagram of an embodiment of the inventive method for identifying and executing operations on protected sensitive data is given. Afterwards, further embodiments as well as embodiments of the system for identifying and executing operations on protected sensitive data will be described.

FIG. 1 shows a block diagram of an embodiment of a method 100 for identifying and executing operations on protected sensitive data (PSD) in a networked computing environment, the method including storing, step 102, a set of data in a first computing environment being operated by, e.g., a Cloud service provider, marking, step 104, protected sensitive data within the set of data by metadata for the set of data, and processing, step 106, data out of the set of data by a local processor of the first computing environment. In response to determining, step 108, that the processing of an operation requires an access to the protected sensitive data identified using the metadata, the following data are sent, step 110, by a sensitive data processor to a remote processor, in particular to a remote sensitive data processor: (i) the protected sensitive data, (ii) information identifying the operation that accesses and utilizes the protected sensitive data, and (iii) a request to perform the operation. The preceding data are received by the remote sensitive data processor. Additionally, the following is activated: de-protecting, step 112, the protected sensitive data by the remote processor which generates unprotected sensitive data from the protected sensitive data, performing, step 114, the operation by the remote processor which comprises accessing and utilizing the unprotected sensitive data and generating a result from performing the operation, and re-protecting, step 116, the unprotected sensitive data by the remote processor. Moreover, the result or results of performing the operation is received, step 118, back by the local processor from the remote sensitive data processor. Here, the result or results may be reintegrated into the set of data at the same location it was extracted beforehand, or generate new protected sensitive data inside the set of data, which will be marked as such in the metadata.

FIG. 2 shows a block diagram of an embodiment of a data privacy solution for Clouds. A computer system 202 CLOUDSYS which may be operated by a Cloud computing provider in the first computing environment comprises a hardware layer 204, a hypervisor 206 and a plurality of guest operating systems 208a, 208b, 208c running each on one of a plurality of guest virtual machines 209a, 209b, 209c. The hardware layer 204 comprises at least a CPU 210, a network adapter 212 and main memory (not shown). Such a system 202 may represent a typical computing environment in a Cloud computing center or first computing environment. The system 202 may be reachable by a user computer system via a gateway in which sensitive data of the user may be encrypted to be stored in an encrypted form in, e.g., a database of such a CLOUDSYS computer system 202. However, as explained above, these protected data may not be accessible by an application running on the computer system 202 when unprotected—"unencrypted"—data are expected by the application. Thus, the sensitive data would have to be decrypted before operations of the application may be performed. However, in this case, the data would be available in an unprotected form at the premise of the Cloud computing provider. Also as explained above, such an availability of unprotected sensitive data for the Cloud computing provider may not be compliant with data privacy laws.

For this reason, the sensitive data processor (SDP) 214 may be integrated into the hypervisor 206. Alternatively, the sensitive data processor 214 may be integrated into the memory management function of an operating system. These alternatives also allow the proposed solution to run inside a guest OS, or on bare metal systems. The sensitive data processor 214 may be enabled to identify protected sensitive data using, e.g., metadata, whenever the protected sensitive data should be processed by one of the plurality of virtual machines 209a, 209b, 209c.

It may be noted that the above-mentioned application may operate on a mixture of sensitive and non-sensitive data, both being part of the same set of data.

In response to the sensitive data processor 214 identifying protected sensitive data 216 in the data stream to be operated on, the sensitive data processor 214 activates a sending of the protected sensitive data 216 to a remote sensitive data processing system RSDPSYS 222 potentially with non-sensitive data 220. The remote sensitive data processing system 222 may comprise a network adapter 224 as part of a hardware layer 226. The remote sensitive data processing system 222 may run an operating system 228 which may be executed using the remote sensitive data processor. The operating system 228 may be executed directly on the hardware layer 226 or optionally with a virtual machine 232. The remote sensitive data processor 230 may be implemented in hardware and software.

The remote sensitive data processor 230 may use a key or key pair 234 to unprotect the protected sensitive data 216. The key or key pair 234 may be an encryption/decryption key instrumental for decrypting the received protected sensitive data 216 within the remote sensitive data processing system 222. Alternatively, the protected sensitive data may have been protected using tokenization. From the above-discussion, it may be clear that the remote sensitive data processor system 222 may be located at a different geographical location compared to the geographical location to the Cloud computing system 202. It may also be clear that the key 234 may have been provided by an external source (e.g., a user) from outside the Cloud computing system 202. In addition, the external source may be outside the remote sensitive data processing system RSDPSYS 222. The Cloud computing system 202 may never have access to the key 234.

In order to execute an operation using the remote sensitive data processor 230, additional information, e.g., the processor status of the computing environment of the Cloud computing system 202 (i.e., the CPU of the hardware layer or the virtual CPU of one of the virtual machines), may also have to be sent as remote sensitive manipulation operation data 218 from the Cloud computing system 202 to the remote sensitive data processing system 222.

After the remote sensitive data processor 230 may have operated on the originally protected sensitive data 216 and now unprotected sensitive data, the remote sensitive data processor 230 may protect the sensitive data again, building again protected sensitive data 216 which may be sent back to the Cloud computing system 202. Here, protected sensitive data 216 may be reintegrated into the data stream of the set of data on which the application is operating on. Advantageously, the protected sensitive data 216 may have the same length measured in bits of all bites as unprotected sensitive data. This may have the advantage that the application is completely unaware—i.e., it is transparent to the application—which of the data have been classified as protected sensitive data.

FIG. 3 shows a block diagram of an embodiment of an integration of a data privacy environment (DPE) 302 and a non-sensitive environment (NSE) 304. Both are separated by a dashed line from each other. The Cloud computing system or the first computing environment 202 belongs to the non-sensitive environment 304 and the remote sensitive data processor 230 as well as the Cloud gateway (CLOUDGW) 306 as well as the sensitive data input 308 and the sensitive data output 310 belong to the data privacy environment 302. The Cloud gateway 306 may be located on the site of the data access symbolized by sensitive data input 308 and sensitive data output 310.

The non-sensitive environment 304, in particular the Cloud computing system 202, does not have access to any encryption/decryption keys required to access the unprotected sensitive data. But with the help of a sensitive data processor 214 and the remote sensitive data processor 230, the encrypted sensitive data can be indirectly processed in the non-sensitive environment 304 as if it would not be protected. Again, alternatively, a protection by tokenization may be used. As mentioned above, the protected sensitive data and the unprotected sensitive data may have the same length. In a typical environment of the present embodiment, this may be achieved by using stream ciphers 312 like CryptMT, SEAL, or SNOW with a short 32-bit initialization vector. The stream cipher 312 may use metadata 314 to identify sensitive data in sensitive data input 308 and may use a protection (encryption) key 234 to protect the sensitive data in 308. The SD/PSD encoder 318 (sensitive data/protected sensitive data) may use information about the protected sensitive data in the memory of the Cloud gateway 306 from a protected sensitive data register 320 to send a mixture of non-sensitive data and sensitive data together with meta information about the protected sensitive data to the non-sensitive environment, namely the Cloud computing system 202.

The protected sensitive data register 320 is used to be able to differentiate between normal, unprotected data and protected sensitive data in the virtual memory of a computer system. The differentiated is needed as there is no way to uniquely identify protected, i.e., encrypted data as such by looking at the data content. The protected sensitive data register 320 tracks each protected data with its virtual address and length. A method for how to intercept data between the data privacy environment 302 and a non-sensitive environment 304 and how to identify sensitive data in the received data stream is specific for a kind of communication to a non-sensitive environment 304.

As an example of such a communication specific approach, the following may be considered: If the non-sensitive environment 304 is hosting Web applications, and the user can insert or modify sensitive data via a Web interface, then the Cloud gateway 306 could implement a Web proxy sitting between the user and the Web server of the non-sensitive environment 304 to use information about the sensitive data sent from the user to the Web server from a metadata 314 registry to protect the sensitive data input 308 using the protection key 234. This meta information 314, for example, may identify the location of inside an HTML document by its enclosing HTML tags.

In the direction from the non-sensitive environment 304 or the Cloud computing system 202, the same processing is applied, but in reverse order. The communication from the non-sensitive environment 304 is intercepted, protected sensitive data is identified in the data stream with the help of the protected sensitive data registry 320 by a SD/PSD decoder 324, decrypted using the SD/PSD key 234 by a stream cipher 322, and finally re-injected into the data stream before it is forwarded as sensitive data output 310.

On the side of the Cloud computing system 202, the data stream may be handled by a SD/PSD encoder 328 and a SD/PSD decoder 326 including a usage of a protected sensitive data register 330.

As previously described, protected sensitive data cannot be identified as such by just looking at the content. Therefore, the information about which parts in a data package may contain protected sensitive data has to be carried along with the data package itself as meta-information or metadata.

Inside a computer system, this metadata will be tracked by the sensitive data processor 214, as described later on. However, data packages have to be transferred between computer systems to exactly carry this metadata from one system to the other. This applies to communication between the non-sensitive environment 304 and the data privacy environment 302 (e.g., from CLOUDGW 306 to CLOUDSYS 202 and vice versa), inside the non-sensitive environment 304 between two Cloud computing systems 202, and even inside a Cloud computing system 202 when data change its status between 'data in memory' and 'data at rest', e.g., when it is written to a local disk or read from it.

In a step, data blocks containing a mixture of non-sensitive data and protected sensitive data are prepared for a transfer by adding metadata about the protected sensitive data—i.e., location within a data stream and length of the protected sensitive data—as metadata to the data package before it gets transferred. With the help of the SD/PSD decoder 326 this process is reversed by separating the meta-information from the data package and using this information to mark the protected sensitive data in the received data package in the virtual memory of the Cloud system 202 in the protected sensitive data register 330.

The just-described steps have to intercept high-level functions like the transfer of an IP package over the network, or the write or read of the page to or from a disk. As such, they may be implemented in one embodiment inside the hypervisor code virtualizing the network interface adapters and local disks on top of the Cloud system's 202 physical hardware (e.g., as part of OpenStack Cinder or OpenStack Nova), or in a further embodiment as modified device drivers for the network adapter or disks running in the guest operating system 208a, 208b, 208c (see FIG. 2).

It may be noted that the novel component sensitive data processor 214 may be added to the hypervisor 206, which might intercept application instructions when accessing sensitive protected data.

An instruction can have multiple input and output parameters, called operands. Each operand may be a virtual memory address or CPU register and may be the target or source of an operation, or both. The sensitive data processor 214 is analyzing the operation of the instruction and the controlling status of each operand, as the status may change due to the operation of the instruction:

saving or loading protected sensitive data (from a target virtual memory address or a CPU register) into a non-sensitive data virtual address or CPU register which changes that target into protected sensitive data, saving or loading non-sensitive data into a virtual memory address or CPU register with a protective sensitive data status results in a reset of the status to non-sensitive data, the sensitive data processor 214 uses the protected sensitive data register 320, 330 to track the status of each virtual memory address and CPU register as data length if it is protected sensitive data;

for above rules, it doesn't matter if the protected sensitive data is used in its full-length or just parts of it.

The sensitive data processor 214 may use this information to offload such instructions, called sensitive data manipulation operations 218, to the remote sensitive data processor 230. For efficiency, the sensitive data processor 214 leverages the remote direct memory access (RDMA) protocol to let the remote sensitive data processor 230 access the memory information in the Cloud computing system 202 and store back the results of the execution. The remote sensitive data processor 230 used the same key 234 as mentioned in the context of the Cloud gateway 306 as well as a protected sensitive data register 332.

FIG. 4 illustrates how the sensitive data processor 214 and the remote sensitive data processor 230 may perform operations on protected sensitive data.

Step 1, 404: The instruction of the application 402 may be analyzed to determine if the instruction is using protected sensitive data. If not, then the instruction may be directly executed on the CPU 406 in the Cloud computing system 202. It may be noted that the CPU 406 may be equivalent to the CPU 210 from the Cloud computing system 202 or equivalent to a virtual CPU as part of any of the plurality of the virtual machines 209a, 209b, 209c. Otherwise, the process will continue with step 2.

It may be noted that, for the analysis, if the instruction is using protected sensitive data (see above), a "present flag" in a page table entry (PTE) may be used. Such a flag typically may exist in the page table entry to indicate that an access to a memory location within a memory page of the virtual memory managed by a routine of the operating system or the hypervisor is mapped to a physical memory location within a physical memory page (if flag is set), or might have been swapped out to a swap file/device (if flag is not set). This flag is repurposed to identify protected sensitive data instead of indicating that a memory page has been swapped out to a swap-file. In the embodiment described here, if the flag is set, the CPU stops the execution, branches to a predefined routine, and hands the instruction over to the remote sensitive data processor 230 for a remote execution. This has the advantage that no additional changes need to be made to the existing hardware design. Alternatively, an addition flag, e.g., a "protected data flag", may be used which would require a change in the hardware design but which would also allow an enhancement in flexibility of the underlying architecture.

Step 2, 408: If one of the source operands of the instruction is a CPU register 410, then the value of the CPU register 410 may be cached in the protected sensitive data register in a CPU register save area 509 (CPUREG SA), as the process to offload the instruction will make use of RDMA and can only access memory addresses.

Step 3, 412: The sensitive data processor 214 may create a request for a remote instruction execution, called remote protected direct memory processing (RPDMP) 414 request to execute the instruction. The instruction includes an operation to be performed on the protected sensitive data pointed to by one or more operands in the instruction. An operand in the instruction may be an address, or may point to an address, at which the protected sensitive data is stored. The request may contain information identifying the instruction and the memory address of each operand.

Step 4, 416: The sensitive data processor 214 may send the RPDMP request to the remote sensitive data processor 230.

Step 5, 418: The remote sensitive data processor 230 may receive the RPDMP 414 request and issue an RDMA request to load the source operands in an unprotected form into its own virtual memory. Thus, decryption (or de-tokenization) of the protected sensitive data pointed to by the source operands may be required after the RDMA request has been completed. The decryption (or de-tokenization) generates unprotected sensitive data from the protected sensitive data.

Step 6, 420: The remote sensitive data processor 230 may load operands into a free suitable CPU 426 register 422 if one of the original source operands was a CPU register.

Step 7, 424: The remote sensitive data processor 230 may execute the instruction. Afterwards, the unprotected sensitive data may be re-protected to restore the protected sensitive data, and the result of performing the operation (by executing the instruction) is sent by the remote sensitive data processor 230 to the sensitive data processor 214.

Step 8, 428: The remote sensitive data processor 230 may issue an RDMA request to store the target operands—now in a protected form again—into the memory of the Cloud computing system 202 and may inform the sensitive data processor 214 about the request completion.

Step 9, 430: The sensitive data processor 214 may load the saved content of the CPU register 422 into the corresponding CPU register 410 if the instruction was using a CPU register as target.

Step 10, 432: The sensitive data processor 214 may change the protected sensitive data status of virtual addresses and CPU registers in the protected sensitive data register 330 accordingly.

Step 11, 434: The sensitive data processor 214 bypasses the offloaded instruction(s) and switches to the next instruction.

Embodiments of the invention may be implemented together with virtually any type of computer, regardless of the platform being suitable for storing and/or executing program code. In particular, examples of a computing system of the first computing environment as well as the remote processor, remote computer system, or remote sensitive data processor may be implemented in a way described hereinafter. For example, as shown in FIG. 5, a computing system 500 may include one or more processors 502 with one or more cores per processor, associated memory elements 504, an internal storage device 506 (details see below), and numerous other elements and functionalities, typical of today's computers (not shown). The memory elements 504 may include a main memory, e.g., a random access memory (RAM), employed during actual execution of the program code, and a cache memory, which may provide temporary storage of at least some program code and/or data in order to reduce the number of times code and/or data must be retrieved from a long-term storage medium or external bulk storage 516 for an execution. Elements inside the computer 500 may be linked together by means of a bus system 518 with corresponding adapters.

The computing system 500 may also include input means such as a keyboard 508, a pointing device such as a mouse 510, or a microphone (not shown). Alternatively, the computing system may be equipped with a touch sensitive screen as main input device. Furthermore, the computer 500 may include output means such as a monitor or screen 512 [e.g., a liquid crystal display (LCD), a plasma display, a light emitting diode display (LED), or cathode ray tube (CRT) monitor]. The computer system 500 may be connected to a network [e.g., a local area network (LAN), a wide area network (WAN)], such as the Internet or any other similar type of network, including wireless networks via a network interface connection 514]. This may allow a coupling to other computer systems, or a storage network, or a tape drive. Those skilled in the art will appreciate that many different types of computer systems exist, and the aforementioned input and output means may take other forms. Generally speaking, the computer system 500 may include at least the minimal processing, input and/or output means, necessary to practice embodiments of the invention.

The computing system 500 may be embodied as a first computer system utilized within the cloud computing system 202, utilizing the one or more processors 502, to realize the functionality of the cloud computing system 202 for implementing embodiments of the present invention. Similarly, the computing system 500 may be embodied as a second computer system utilized within the remote sensitive data processing system 222, utilizing the one or more processors 502, to realize the functionality of the remote sensitive data processing system 222 for implementing embodiments of the present invention.

A computer program product of the present invention comprises a computer readable storage device having computer readable program code stored therein, said program code containing instructions executable by a processor of a data processing system to implement the methods of the present invention.

A data processing system of the present invention comprises a processor, a memory coupled to the processor, and a computer readable storage device coupled to the processor, said storage device containing program code executable by the processor via the memory to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or another devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for performing an operation on sensitive data, said method comprising:

receiving, from a computing system by a remote processor of a data processing system during execution of an application in the computing system using a local processor in the computing system to implement the execution of the application in the computing system, information comprising: (i) a data stream that includes protected sensitive data, wherein the protected sensitive data is an encryption of unprotected sensitive data via use of a protection key, (ii) an identification of an operation required by the application program to be performed on the unprotected sensitive data during the execution of the application program in the computing system, wherein the operation accesses and utilizes the unprotected sensitive data during performance of the operation, and (iii) a request to perform the operation, wherein the computing system is external to the data processing system;

said remote processor de-protecting the received protected sensitive data by decrypting the protected sensitive data, said de-protecting generating the unprotected sensitive data from the protected sensitive data;

after said de-protecting, said remote processor performing the operation, said performing the operation comprising accessing and utilizing the unprotected sensitive data and generating a result;

after said performing the operation, said remote processor re-protecting the unprotected sensitive data, said re-protecting restoring the protected sensitive data by encrypting the unprotected sensitive data via use of the protection key; and said remote processor sending the result to the computing system, wherein the said de-protecting, said performing the operation, and said re-protecting have characteristics of being transparent to the execution of the application program in the computing system and of not interrupting a flow of the execution of the application program in the computing system.

2. The method of claim 1, wherein the information further comprises (iv) a processor status of the local processor in the computing system, and wherein said receiving the processor status of the local processor provides a complete computer context that enables the characteristics to exist.

3. The method of claim 1, wherein the local processor is a sensitive data processor (SDP), wherein the remote processor is a remote sensitive data processor (RSDP), and wherein said receiving the information comprises receiving the information via a direct memory access (RDMA) from a memory of the computing system to a memory of the data processing system without involving the computing system's operating system and without involving the data processing system's operating system.

4. The method of claim 1; wherein the method further comprises said remote processor receiving a key from an external source outside the computing system, wherein the computing system does not access to the key at e external source, and wherein said de-protecting the protected sensitive data comprises utilizing the key to de-protect the protected sensitive data.

5. The method of claim 4, wherein the external source is outside the data processing system.

6. The method of claim 1, wherein the protected sensitive data and the unprotected sensitive data have a same length.

7. The method of claim 1, wherein said receiving the identification of the operation comprises receiving a computer instruction, wherein the instruction comprises the operation and one or more operands pointing to the protected sensitive data, and wherein said method comprises:

said remote processor executing the computer instruction, said executing the computer instruction comprising said performing the operation.

8. The method of claim 7, wherein a first operand of the one or more operands is a CPU register.

9. A computer program product, comprising a computer readable hardware storage device having computer readable program code stored therein, said program code containing instructions executable by a remote processor of a data processing system to implement a method for performing an operation on sensitive data, said method comprising:

receiving, from a computing system by the remote processor of a data processing system during execution of an application in the computing system using a local processor in the computing system to implement the execution of the application in the computing system, information comprising: (i) a data stream that includes protected sensitive data, wherein the protected sensitive data is an encryption of unprotected sensitive data via use of a protection key, (ii) an identification of an operation required by the application program to be performed on the unprotected sensitive data during the execution of the application program in the computing system, wherein the operation accesses and utilizes the unprotected sensitive data during performance of the operation, and (iii) a request to perform the operation, wherein the computing system is external to the data processing system;

said remote processor de-protecting the received protected sensitive data by decrypting the protected sensitive data, said de-protecting generating the unprotected sensitive data from the protected sensitive data;

after said de-protecting, said remote processor performing the operation, said performing the operation comprising accessing and utilizing the unprotected sensitive data and generating a result;

after said performing the operation, said remote processor re-protecting the unprotected sensitive data; said re-protecting restoring the protected sensitive data by encrypting the unprotected sensitive data via use of the protection key; and said remote processor sending the result to the computing system, wherein the said de-protecting, said performing the operation, and said re-protecting have characteristics of being transparent to the execution of the application program in the computing system and of not interrupting a flow of the execution of the application program in the computing system.

10. The computer program product of claim 9, wherein the information further comprises (iv) a processor status of the local processor in the computing system, and wherein said receiving the processor status of the local processor provides a complete computer context that enables the characteristics to exist.

11. The computer program product of claim 9, wherein the local processor is a sensitive data processor (SDP), wherein the remote processor is a remote sensitive data processor (RSDP), and wherein said receiving the information comprises receiving the information via a direct memory access (RDMA) from a memory of the computing system to a memory of the data processing system without involving the computing system's operating system and without involving the data processing system's operating system.

12. The computer program product of claim 9, wherein the method further comprises said remote processor receiving a key from an external source outside the computing system, wherein the computing system does not have access to the key at the external source, and wherein said de-protecting the protected sensitive data comprises utilizing the key to de-protect the protected sensitive data.

13. The computer program product of claim 12, wherein the external source is outside the data processing system.

14. The computer program product of claim 9, wherein the protected sensitive data and the unprotected sensitive data have a same length.

15. A data processing system comprising a remote processor, a memory coupled to the remote processor, and a computer readable storage device coupled to the remote processor, said storage device containing program code executable by the remote processor via the memory to implement a method for performing an operation on sensitive data, said method comprising:

receiving, from a computing system by the remote processor of a data processing system during execution of an application in the computing system using a local processor in the computing system to implement the execution of the application in the computing system, information comprising: (i) a data stream that includes protected sensitive data, wherein the protected sensitive data is an encryption of unprotected sensitive data via use of a protection key, (ii) an identification of an operation required by the application program to be performed on the unprotected sensitive data during the execution of the application program in the computing system, wherein the operation accesses and utilizes the unprotected sensitive data during performance of the operation, and (iii) a request to perform the operation, wherein the computing system is external to the data processing system;

said remote processor de-protecting the received protected sensitive data by decrypting the protected sensitive data, said de-protecting generating the unprotected sensitive data from the protected sensitive data;

after said de-protecting, said remote processor performing the operation, said performing the operation comprising accessing and utilizing the unprotected sensitive data and generating a result;

after said performing the operation, said remote processor re-protecting the unprotected sensitive data, said re-protecting restoring the protected sensitive data by encrypting the unprotected sensitive data via use of the protection key; and said remote processor sending the result to the computing system, wherein the said de-protecting, said performing the operation, and said re-protecting have characteristics of being transparent to the execution of the application program in the computing system and of not interrupting a flow of the execution of the application program in the computing system.

16. The computer system of claim 15, wherein the information further comprises (iv) a processor status of the local processor in the computing system, and wherein said receiving the processor status of the local processor provides a complete computer context that enables the characteristics to exist.

17. The computer system of claim 15, wherein the local processor is a sensitive data processor (SDP), wherein the remote processor is a remote sensitive data processor (RSDP), and wherein said receiving the information comprises receiving the information via a direct memory access (RDMA) from a memory of the computing system to a memory of the data processing system without involving the computing system's operating system and without involving the data processing system's operating system.

18. The computer system of claim 15, wherein the method further comprises said remote processor receiving a key from an external source outside the computing system, wherein the computing system does not have access to the key at the external source, and wherein said de-protecting the protected sensitive data comprises utilizing the key to de-protect the protected sensitive data.

19. The computer system of claim 18, wherein the external source is outside the data processing system.

20. The computer system of claim 15, wherein the protected sensitive data and the unprotected sensitive data have a same length.

* * * * *